O. C. BERRY.
PROCESS OF PRODUCING GAS FROM BITUMINOUS FUEL.
APPLICATION FILED MAY 6, 1908.
1,116,216.
Patented Nov. 3, 1914.
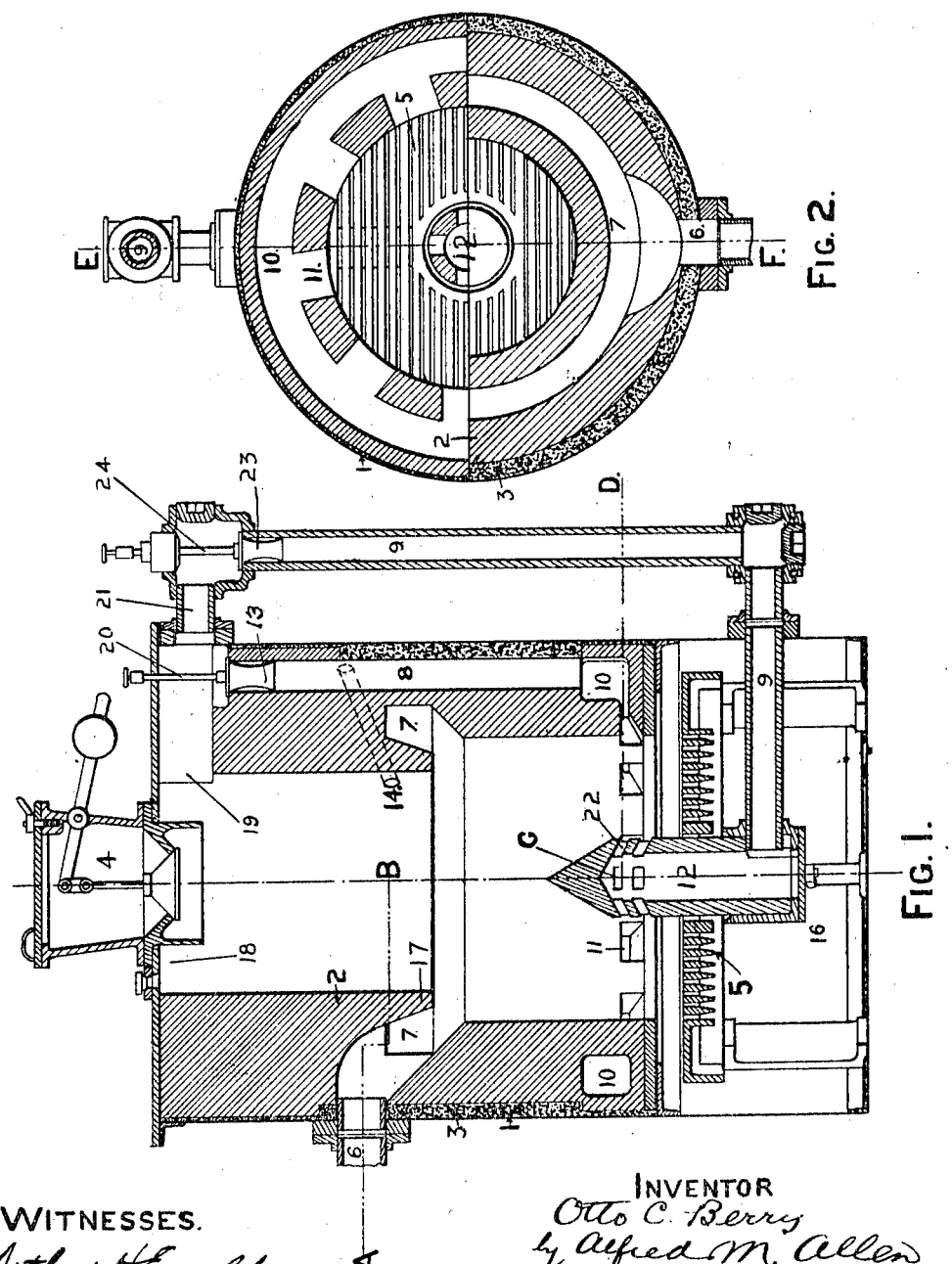

UNITED STATES PATENT OFFICE.

OTTO C. BERRY, OF GLENDALE, OHIO.

PROCESS OF PRODUCING GAS FROM BITUMINOUS FUEL.

1,116,216.      Specification of Letters Patent.      Patented Nov. 3, 1914.

Application filed May 6, 1908. Serial No. 431,177.

*To all whom it may concern:*

Be it known that I, OTTO C. BERRY, a citizen of the United States, residing in Glendale, county of Hamilton, and State of Ohio, have invented certain new and useful Improvements in the Process of Producing Gas from Bituminous Fuel, of which the following is a full, clear, and exact description, reference being had to the accompanying drawings, forming part of this specification.

The special object of my invention is to provide a process in which bituminous fuel can be used for the production of the gas, and by which novel process I am able to eliminate entirely in the furnace itself, all of the tarry vapors which necessarily are distilled at the lower temperatures with the use of fuel of this character.

Coal tar is a complex mixture of hydrocarbons. The processes in common use in gas producer practice for the destruction of these hydrocarbons are all based upon one or both of the following well known principles: (a) If tar vapor is caused to reach a sufficiently high temperature in the presence of incandescent fuel, it will be completely reduced to fixed gases and free carbon, or lamp black. (b) Tar vapor will burn to carbon dioxid $CO_2$ and water vapor, $H_2O$. These gases may then be passed through a bed of incandescent fuel and reduced to free hydrogen $H_2$, and carbon monoxid, CO. Many producers have been designed to apply these principles in what is known as the recirculating process. In this process the distilled volatile matter is drawn off from the upper portion of the fuel column and then reëntered into the producer at some point lower down. These recirculated gases may or may not be mixed with air before entering the producer, and may be reëntered below the grates and there completely burned, as in the Gerdes process, or at the combustion zone, or at the incandescent zone, as in the Whitfield producers.

In the producers previously designed, the fuel above the point where the finished gas is taken off, has been heated by conduction from below, and in some cases by the hot gases having their exit passageway through or around the upper part of the coal bed. In some cases, notably in the Mond process, some of the producer gas itself is drawn up through these upper layers of coal, and aids in heating them.

Coal is a very poor conductor of heat. Very little heat can pass through a bed of coal by being conducted or radiated from lump to lump. Careful tests show that a temperature of 1,000° F. or more is necessary to drive off the last trace of tar from American coals. It requires a large amount of heat to distil all of the moisture and volatile matter and heat the coal up to this temperature. Experience shows that the temperature necessary to distil off the last trace of tar from the coal used must be maintained up to a point some little distance above that at which the finished gas leaves the fuel column. It is a part of the object of this invention to supply this heat by recirculating a sufficiently large amount of the hot gases from the incandescent zone of the producer.

The gases from each point on the grates tend to form a definite path for themselves through the fuel column to the point of outlet. Since the coal is such a poor conductor of heat, the temperature at any point in the incandescent zone will depend upon the temperature reached by the gases in the combustion zone immediately below. Should too much of the reëntered gas be concentrated at one point on the grates, they would tend to form cold paths for themselves up through the incandescent zone, and thus fail to be properly reduced. It is a part of the object of my invention to cause the reëntered gases to be introduced immediately below the combustion zone of the fuel, and to be evenly distributed over the entire grate area.

The ideal explosive mixture of producer gas and air contains substantially equal volumes of each. In case either gas or air is present in any very considerable excess, the mixture will not be explosive. For this reason it is permissible to mix small amounts of gas with the air for combustion, without it being necessary for them to burn as they mix. In this process I readmit so much of the gas that it is necessary for it to burn as it mixes with the air, to prevent the formation of large bodies of an explosive mixture. I therefore introduce the gases under the combustion zone of the producer, unmixed with air, where they are quite evenly distributed over the entire grate area and burn as they are there mixed with air.

In the apparatus I have designed to carry out my process the necessary draft is obtained from the suction of the engine, although the process can be applied very readily to pressure producers without departing from the spirit of my invention.

To carry out my process, I make use of the following apparatus as illustrating one type of producer.

In the drawings Figure 1 is a central vertical section taken on the lines E—F of Fig. 2 of my improved producer. Fig. 2 is a cross section of same, taken on the lines A—B, C—D, of Fig. 1.

The producer is provided with a suitable sheet steel shell 1, and a substantial fire brick lining 2, with fire clay packing 3, between the fire brick lining and the outer shell.

4 is the coal hopper for the introduction of the coal to the producer, of any suitable and well known construction, and 5 are the grate bars suitably supported in any convenient way over the ash pit 16.

Formed in the fire clay lining about midway from top to bottom of the producer is an annular chamber 7, having a free uninterrupted annular opening in connection with the central portion of the producer. This annular chamber and its opening into the main chamber of the producer, is preferably formed by the overhanging depending lip 17, of the fire clay lining. Instead of permitting this over-hanging lip 17, to support itself as illustrated in the drawings, the annular chamber 7, may be formed within the fire clay lining and a sufficient number of ports may be left from the main chamber into this annular chamber 7, of sufficient size to permit a substantially uninterrupted flow of gases from the main chamber into the annular chamber. Connected with this annular chamber 7, at one side is the gas outlet 6, for the producer gas to the engine. In the upper portion of the retort the magazine extension provides an annular chamber 18, which is free from coal and even without a coal hopper of the construction illustrated, the producer is never completely filled with coal so that there is always an open chamber at the upper end.

19 is a passageway from this chamber of substantial size, and 10 is an annular chamber formed in the fire clay lining in the lower portion of the producer, and provided with ports 11, opening into the ash zone just below the combustion zone of the fuel column. This annular chamber 10, is connected with the opening 19, by a passageway 8, of considerable size, formed in the fire brick lining, or between the fire brick lining and the producer shell. In the upper end of this passageway is located a steam blower 13, of considerable size, and of any ordinary construction, the steam being supplied through a valve controlled pipe 20. Another passageway is also provided comprising pipe 9, opening into the passageway 19, through the port 21. which pipe 9, is connected horizontally with the fire brick chamber 12, supplied with ports 22, for central delivery of the gases into the middle portion of the producer just below the combustion chamber of the fuel column. This pipe 9 is also supplied with an ordinary construction of steam blower 23, similar to the steam blower 13, and the steam is supplied to this latter blower through the valve controlled steam pipe 24.

14 is an ordinary construction of a sight opening or peep hole through the fire clay lining to enable the operator to determine the approximate temperature of the mass of fuel at the point of sight.

In operation, my improved producer follows the general practice of a recirculating producer in part as follows: The coal is trapped into the retort through the coal hopper 4, the only air inlet is under the grate bars 5, and the finished gas is taken off near the middle of the fuel column, through the annular chamber 7 and the pipe 6. It improves upon the previous practice in the following points:—

(a) A sufficiently strong blower is provided and passageways of sufficient size, so that a considerable portion of the hot producer gas itself may be drawn up from below and recirculated along with the volatile hydrocarbons distilled off from the green coal. The amount of gas recirculated is so regulated as to keep the coal at the desired temperature at peep-hole 14. This accomplishes two results; first,—the sensible heat of the gas is given up to the coal, heating it to a temperature beyond that at which all the tarry vapors are driven off. Second,— the positive current of gas upward forces the recirculation of all the tarry vapors driven off and prevents their backing up and passing out with the gas to the engine.

(b) The recirculating blower is sufficiently powerful to continue its delivery of gas, in spite of any reasonable increase in the engine suction. This makes the recirculating process positive and continuous, no matter how much the engine suction may vary.

(c) The gases are reëntered into the producer immediately below the combustion zone of the fuel, and in such a way as to distribute them quite uniformly over the entire area of that portion of the base of the fuel column that is open to admit air. This forces the returned gas to mix with the air immediately before the combustion zone is reached, and air and gas will be quite uniformly mixed at that point. Any combustible mixture will burn as it is formed, by reason of the burning fuel just above it.

I claim—

1. The process of manufacturing producer gas from bituminous fuel, which consists in maintaining in that part of the producer immediately above the highest point passed through by the finished gas, in the recirculating type of producer, a temperature sufficient to distil all of the tarry vapors from the fuel, by drawing a sufficiently large portion of the hot finished producer gas from below up through said body of fuel to accomplish this, in connection with the heat conducted or radiated to this part, and then in returning the gas, along with these distilled tarry vapors and unmixed with air, into the producer immediately below or into the combustion zone of the fuel column.

2. The process of manufacturing producer gas from bituminous fuel, which consists in maintaining in that part of the producer immediately above the highest point passed through by the finished gas, in the recirculating type of producer, a temperature sufficient to distil all of the tarry vapors from the fuel, by drawing a sufficiently large portion of the hot finished producer gas from below up through said body of fuel to accomplish this, in connection with the heat conducted or radiated to this part, by means of a sufficiently powerful suction to deliver the gas in spite of any reasonable increase in the engine suction, and then in returning the gas along with the distilled tarry vapors and unmixed with air into the producer immediately below or into the combustion zone of the fuel column.

3. The process of manufacturing producer gas from bituminous fuel, which consists in maintaining in that part of the producer immediately above the highest point passed through by the finished gas, in the recirculating type of producer, a temperature sufficient to distil all of the tarry vapors from the fuel, by drawing a sufficiently large portion of the hot finished producer gas from below up through said body of fuel to accomplish this, in connection with the heat conducted or radiated to this part, and when in returning the gas, along with these tarry vapors and unmixed with air to a zone immediately below the combustion zone of the fuel, and in such a way as to distribute them over substantially the entire area of that portion of the bottom of the fuel column that is open to admit air, and allowing air and gas to mix just before or just after entering the above mentioned combustion zone.

4. The process of manufacturing producer gas from bituminous fuel, which consists in maintaining in that part of the producer immediately above the highest point passed through by the finished gas, in the recirculating type of producer, a temperature sufficient to distil all the tarry vapors from the fuel, by drawing a sufficiently large portion of the hot finished producer gas from below up through said body of fuel to accomplish this, in connection with the heat conducted or radiated to this part, by means of a sufficiently powerful suction to deliver the gas in spite of any reasonable increase in the engine suction, and then in returning the gas along with these tarry vapors and unmixed with the air to a zone immediately below the combustion zone of the fuel, and in such a way as to distribute them over substantially the entire area of that portion of the bottom of the fuel column that is open to admit air, and allowing air and gas to mix just before or just after entering the above mentioned combustion zone.

OTTO C. BERRY.

Witnesses:
ARTHUR H. EWALD,
BESSIE A. BEALL.